(12) United States Patent
Kelm

(10) Patent No.: US 11,550,745 B1
(45) Date of Patent: Jan. 10, 2023

(54) REMAPPING TECHNIQUES FOR MESSAGE SIGNALED INTERRUPTS

(71) Applicant: Apple Inc., Cupertino, CA (US)

(72) Inventor: John H. Kelm, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/480,449

(22) Filed: Sep. 21, 2021

(51) Int. Cl.
*G06F 13/24* (2006.01)
*G06F 12/1045* (2016.01)
*G06F 13/16* (2006.01)

(52) U.S. Cl.
CPC .......... *G06F 13/24* (2013.01); *G06F 12/1063* (2013.01); *G06F 13/1668* (2013.01); *G06F 2212/657* (2013.01)

(58) Field of Classification Search
CPC .. G06F 13/24; G06F 12/1063; G06F 13/1668; G06F 2212/657
See application file for complete search history.

(56) References Cited

U.S. PATENT DOCUMENTS

| | | | |
|---|---|---|---|
| 8,055,827 B2 | 11/2011 | Serebrin et al. | |
| 8,489,789 B2 | 7/2013 | Serebrin et al. | |
| 8,612,659 B1 | 12/2013 | Serebrin et al. | |
| 10,642,498 B2 | 5/2020 | Benisty et al. | |
| 2008/0126617 A1* | 5/2008 | Brownlow | G06F 9/5077 710/48 |
| 2010/0262741 A1 | 10/2010 | Hayakawa et al. | |
| 2011/0047309 A1* | 2/2011 | Brinkmann | G06F 13/24 710/260 |
| 2011/0320860 A1* | 12/2011 | Coneski | G06F 11/0748 714/39 |
| 2014/0156894 A1* | 6/2014 | Tsirkin | G06F 13/24 710/260 |
| 2016/0055108 A1* | 2/2016 | Williamson | G06F 9/50 710/261 |
| 2020/0264912 A1 | 8/2020 | Raisch et al. | |

* cited by examiner

*Primary Examiner* — Zachary K Huson
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to address mapping for message signaled interrupts. In some embodiments, an apparatus includes interrupt control circuitry configured to process, from multiple client circuits, message signaled interrupts that include addresses in an interrupt controller address space. First and second interface controller circuitry may control respective peripheral interfaces for multiple devices. Remap control circuitry may be configured to access a first table based on at least a portion of virtual addresses of a first message signaled interrupt from the first interface controller circuit and generate a first address in the interrupt controller address space based on an accessed entry in the first table and access a second table based on at least a portion of virtual addresses of a second message signaled interrupt from the second interface controller circuit and generate a second address in the interrupt controller address space based on an accessed entry in the second table.

20 Claims, 9 Drawing Sheets

REMAPPING TECHNIQUES FOR MESSAGE SIGNALED INTERRUPTS

BACKGROUND

Technical Field

This disclosure relates generally to peripheral interfaces and more particularly to remapping addresses of message signaled interrupts to an interrupt controller address space.

Description of the Related Art

Message signaled interrupts (MSIs) are an in-band technique for signaling an interrupt, e.g., as used by Peripheral Component Interconnect express (PCIe) peripheral interfaces. A given computing device may connect to multiple peripheral devices, each of which may have multiple functions that each may request up to a threshold number of MSIs. Further, a given device may include multiple PCIe root complexes, each of which may include multiple links.

Some devices include a system on a chip (SoC), which may implement an interrupt controller. The interrupt controller may receive information for message signaled interrupts over a communications fabric, for example.

DETAILED DESCRIPTION

In disclosed embodiments, an internal interrupt controller receives interrupt data from multiple peripheral interface controllers, each of which may communicate with multiple peripheral devices. In some situations, it may be advantageous not to expose the address space of the interrupt controller to external devices. Further, it may be advantageous for the interrupt controller to remain agnostic to the encoding of MSIs on peripheral interface(s), e.g., to flexibly support multiple interrupt protocols.

Therefore, in some embodiments discussed in detail below, a device maintains a remapping table for each peripheral interface controller (e.g., for each PCIe root complex link) that remaps virtual MSI addresses to an address space of the interrupt controller.

Figure 1:
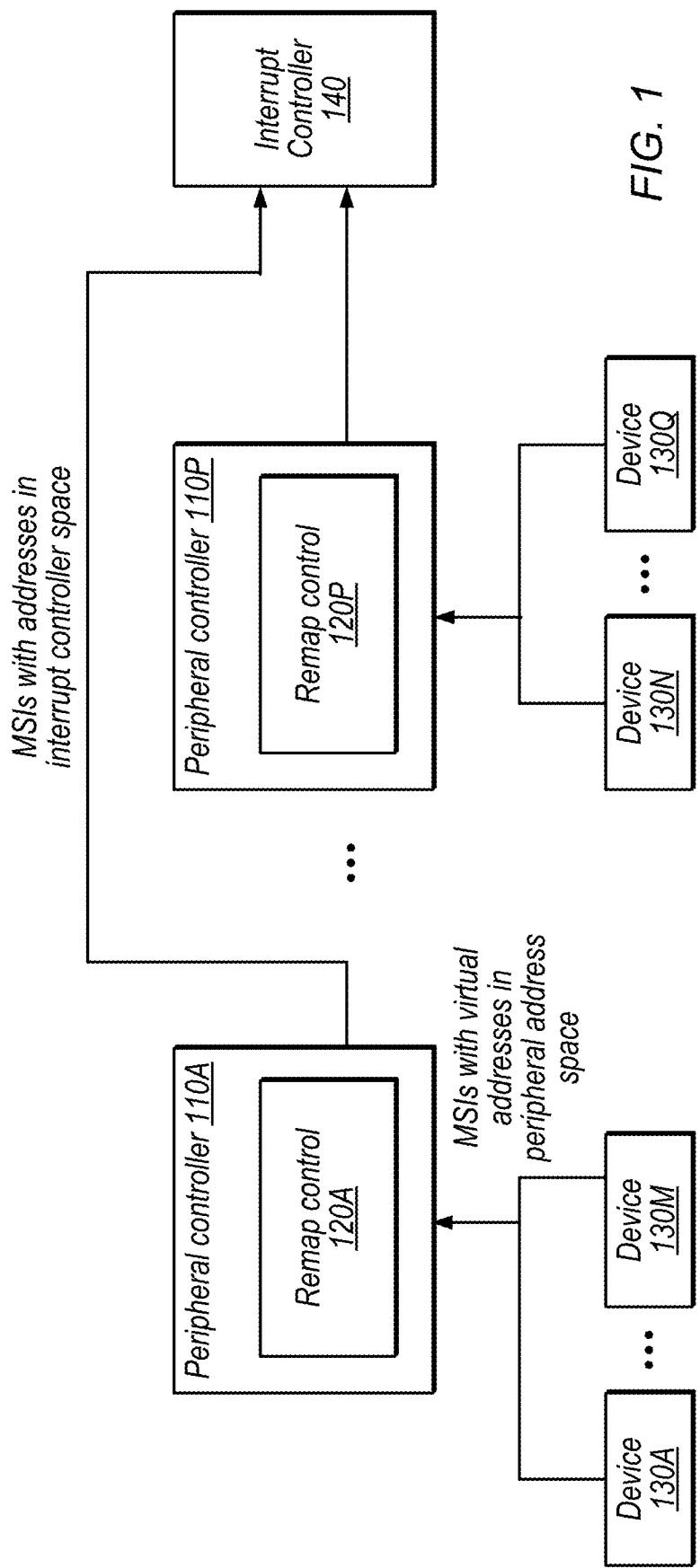
FIG. 1 is a block diagram illustrating an example system that includes control circuitry configured to remap interrupts, according to some embodiments.

FIG. 1 is a block diagram illustrating an example system that includes control circuitry configured to remap interrupts, according to some embodiments. In the illustrated embodiment, the system includes multiple peripheral controllers 110A-110P, devices 130A-130Q, and interrupt controller 140.

Peripheral controllers 110 may control the same class of peripheral interface (e.g., PCIe) or different peripheral interfaces (e.g., one USB and one PCIe). In some embodiments, peripheral controllers 110 are PCI root complex links. As shown, each peripheral controller 110 includes remap control circuitry 120, discussed in detail below.

Devices 130, in the illustrated embodiment, are configured to communicate with peripheral controllers 110 via the peripheral interface. In some embodiments, the set of devices connected to each controller is non-overlapping. In other embodiments, the set of devices may partially overlap. In some embodiments, each device may implement multiple functions (e.g., PCIe functions), each of which may request up to a threshold number of interrupts. Note that devices 130 may include external devices, internal components of a computing device, or both.

Interrupt controller 140, in the illustrated embodiment, is configured to receive interrupt signals and take appropriate actions, which may include signaling other circuitry when appropriate, enforcing priority schemes, determining when a processor cannot be interrupted, etc. In some embodiments, interrupt controller 140 receives interrupts via a communication fabric (not shown in FIG. 1). For example, interrupt controller 140 may implement multiple interrupt registers and writing to an interrupt register (or a portion thereof, e.g., a single bit) may signal a pending interrupt. In some embodiments, the device does not expose the address space of interrupt controller 140 to devices 130. Rather, in the illustrated embodiment, remap control circuitry 120 is configured to remap virtual addresses for received MSIs in a peripheral address space (which may be a virtual address space programmed by the device) to MSIs with addresses in the interrupt controller space, as discussed in detail below. The remap control circuitry 120 may also change the encoding of the MSIs, such that interrupt controller 140 need not be aware of the encoding of the MSIs from devices 130.

In various embodiments, including separate remap control circuitry 120 in different peripheral controllers may facilitate non-exposure of the interrupt controller address space and provide scalability for different SoC designs. Remap control circuitry 120 may include respective tables to map virtual addresses to interrupt controller addresses, as discussed in detail below. Remap control circuitry 120, software, or both may ensure that at most one table entry across the tables indicates a particular interrupt entry in interrupt controller 140 to avoid conflicts.

In some embodiments, remap control circuitry 120 is also configured to detect virtual addresses that are not in an interrupt address range. In some embodiments, remap control circuitry 120 is configured to translate a virtual address to a physical DRAM address in this situation, which may be handled by a memory controller. Mapping MSIs to a non-DRAM space may improve overall security, in various embodiments.

Figure 2:
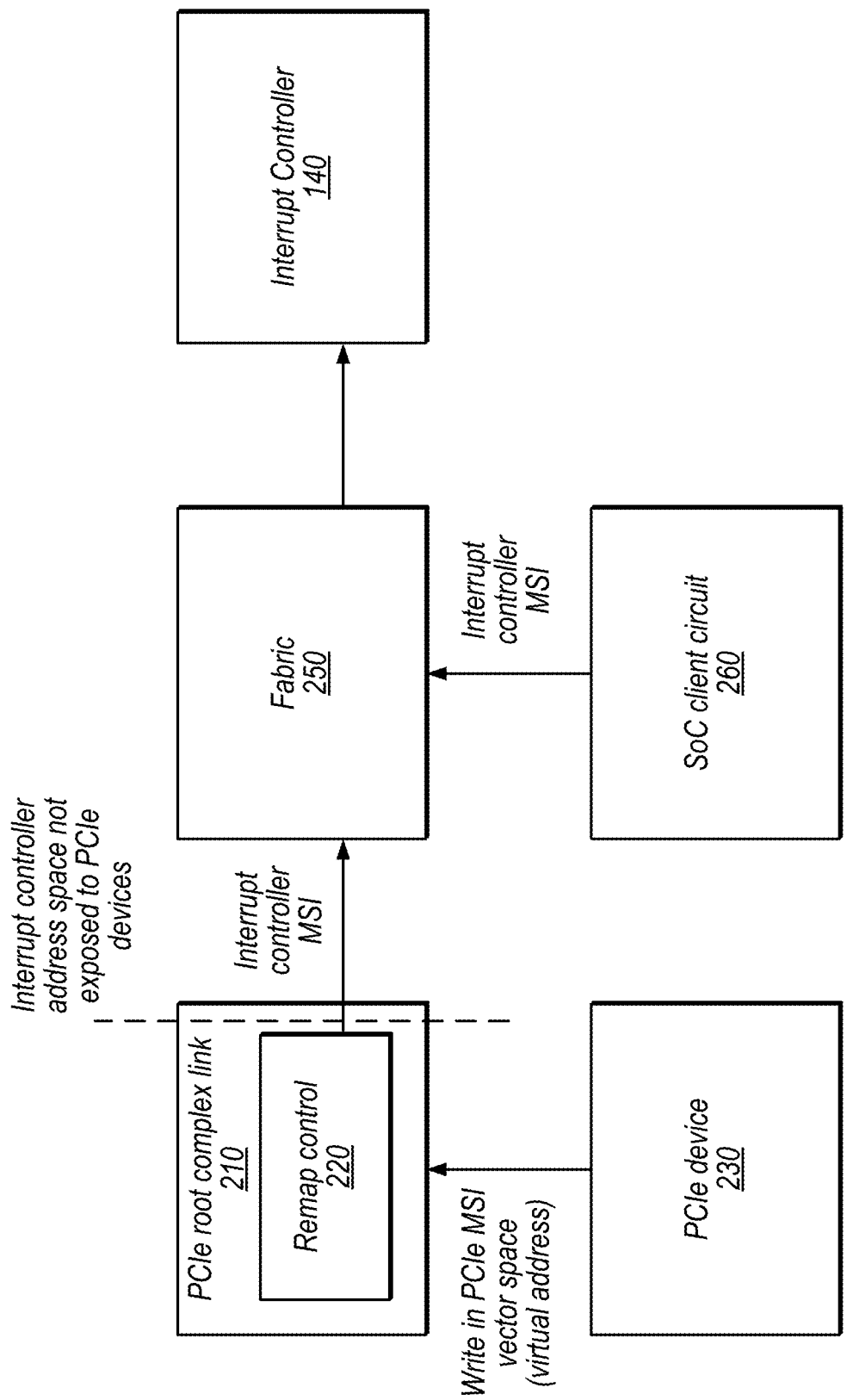
FIG. 2 is a block diagram illustrating an example remapping of PCIe MSIs in the SoC context, according to some embodiments.

FIG. 2 is a block diagram illustrating an example remapping of PCIe MSIs in the SoC context, according to some embodiments. In the illustrated embodiment, the computing system includes PCIe root complex link 210 (which communicates with a PCIe device 230, e.g., via a PCIe endpoint), fabric 250, interrupt controller 140, and SoC client circuit 260.

PCIe root complex link 210, in the illustrated embodiment, receives MSI interrupts as writes to a PCIe MSI vector space using a virtual address. In some embodiments, remap control circuitry 220 is configured as described above with reference to elements 120, and includes PCIe-specific circuitry in the embodiment of FIG. 2. In some embodiment's, remap control circuitry 220 is configured to remap the MSI virtual address to an MSI format supported by interrupt controller 140 for transmission via fabric 250. As shown other clients such as SoC client circuit 260 may also use this format for message signaled interrupts via fabric 250.

As shown, the interrupt controller address space is not exposed to PCIe devices that communicate with PCIe root complex link 210. This may reduce susceptibility to malicious or error-based tampering by peripheral devices, attempts to determine internal design details, or both, relative to embodiments in which the interrupt controller address space is exposed. Note that only a single PCIe root complex link is shown for purposes of illustration, but as discussed above there may be multiple remap control circuits 220 for different links, which may be included in the same root complex or different root complexes. Further, while example PCIe MSIs are discussed herein, disclosed techniques may also be used for MSI-X interrupts, among other contemplated types of interrupts.

Figure 3:
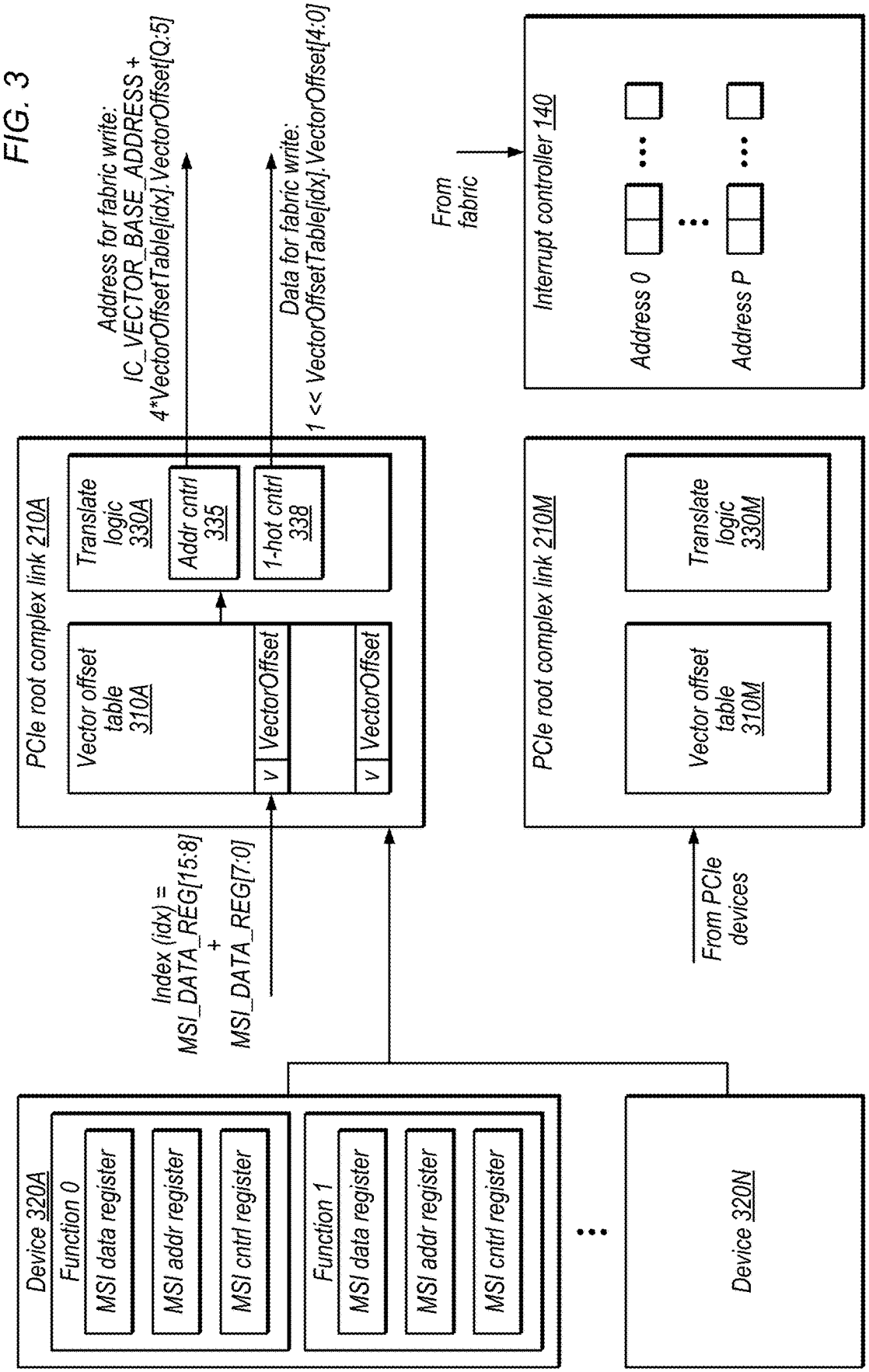
FIG. 3 is a block diagram illustrating a detailed example remap technique, according to some embodiments.

FIG. 3 is a block diagram illustrating a detailed example remap technique, according to some embodiments. In the illustrated example, multiple PCIe root complex links 210A-210M each communicate with multiple devices (e.g., link 210A communicates with devices 320A-320N).

As shown, each device may implement one or more PCIe functions. In the illustrated embodiment, each function has a corresponding MSI data register, MSI address register, and MSI control register. In some embodiments, the system supports a threshold number of unique remapped interrupt requests at the interrupt controller for root complexes in the system, e.g., based on the number of locations in the interrupt controller address space and number of bits per location. In some embodiments, all root complexes of the computing system program the same MSI target virtual address into the MSI address register when configuring functions. The remap circuitry then decodes the MSI message data field from incoming messages to validate interrupts and determine where to route then.

In the illustrated embodiment, each link maintains a vector offset table 310 and translate logic 330 (these elements are examples of remap control circuitry 120). In some embodiments, all instances of the remap circuitry use the same vector base address, such that all root complexes share a common pool of interrupt controller MSI vectors. Therefore, valid MSIs from root complexes via the fabric may map to the range of interrupt addresses from a base address to a threshold greatest address based on the number of PCIe interrupt requests supported.

In some embodiments, each entry in a vector offset table includes a valid bit (v) and a vector offset field that maps to an interrupt controller register, as discussed in detail below. Note that different vector tables in the same system may have different numbers of entries and the number of entries may be parameterizable. In the illustrated embodiment, the remap circuitry indexes into the vector table based on adding two sets of bits from the MSI data register. Translate logic 330 then generates an address and data for a fabric write based on the vector offset value at that index. In the illustrated example, the address is the IC_VECTOR_BASE_ADDRESS+4*VectorOffsetTable[idx]·VectorOffset[Q:5], where the Q lower bits of the MSI data register indicate the function being requested. In the illustrated embodiment, the data for the fabric write is one-hot encoded as 1<<VectorOffsetTable[idx]·VectorOffset[4:0]. In the illustrated embodiment, the interrupt controller 140 receives the address and determines a corresponding interrupt register. It uses the data from the fabric and sets the corresponding bit in the identified address, thereby identifying the triggered interrupt.

The MSI control register, in some embodiments, indicates the number of interrupts requested by the function. In some embodiments, this number is a power of two and has a threshold greatest number of interrupts that can be requested. In some embodiments, remap circuitry allocates a number of entries in the vector offset table 310 based on the value of the MSI control register. In some embodiments, entries for a given function are stored contiguously in a vector offset table.

Note that the various fields, encodings, PCIe details, etc. shown in FIG. 3 are included for purposes of illustration, but are not intended to limit the scope of the present disclosure. Various other fields, encodings, peripheral protocols, interrupt controller protocols, etc. may be used in other embodiments.

Figure 4:
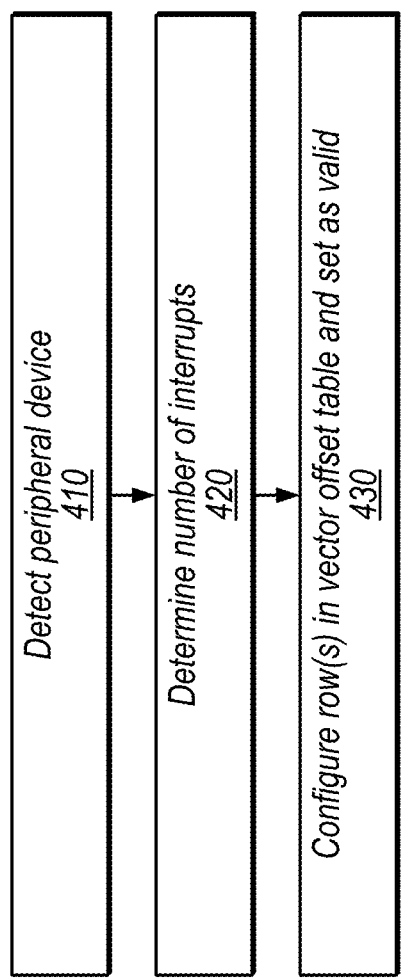
FIG. 4 is a flow diagram illustrating an example technique for configuring a vector offset table for a detected device, according to some embodiments.

FIG. 4 is a flow diagram illustrating an example technique for configuring a vector offset table for a detected device, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a computing system detects a peripheral device. This may be due to a new connection of the device, powering on of the device, etc. At 420, the system determines the number of interrupts requested by the device. For example, in the PCIe context, this may be based on the MSI control register contents for one or more functions of the device. At 430, in the illustrated embodiment, the system configures one or more rows in the vector offset table and sets those rows as valid. The configuration may include populating the VectorOffset field and ensuring that it does not conflict with any other such fields that are associated with interrupt controller 140. As discussed above, the mapped locations in the interrupt controller space may or may not be contiguous.

Note that, in some embodiments, a device may include multiple interrupt controllers 140. In these embodiments, the same vector offset may be used in different tables that are associated with different interrupt controllers.

Figure 5:
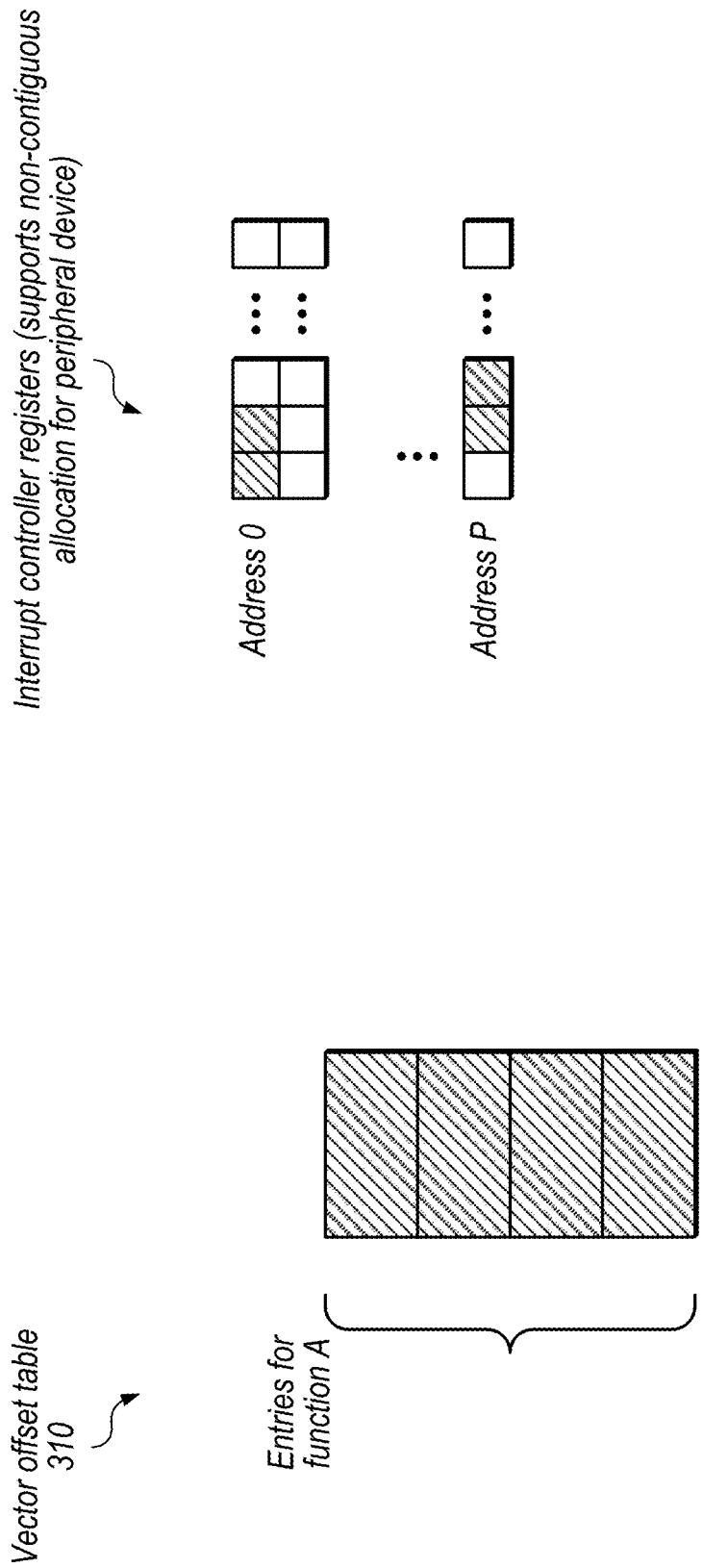
FIG. 5 is a diagram illustrating an example mapping to non-contiguous interrupt controller locations, according to some embodiments.

FIG. 5 is a diagram illustrating an example mapping to non-contiguous interrupt controller locations, according to some embodiments. In the illustrated example, four interrupt entries for a PCIe function are contiguously located in the vector offset table 310. In some embodiments, the peripheral interface may support only contiguous mapping of such interrupts from a given function. In this example, however, the four mapped bits in the interrupt controller are located in non-contiguous locations (two at address 0 and two at address P). This may allow flexibility in mapping peripheral interrupts to interrupt controller interrupts, in various embodiments.

In some embodiments, if an insufficient number of locations in the interrupt controller 140 are available to map interrupts for a device, the remap control circuitry 120 is configured to signal for one or more devices to use a legacy interrupt scheme via the peripheral interface.

Example Method

Figure 6:
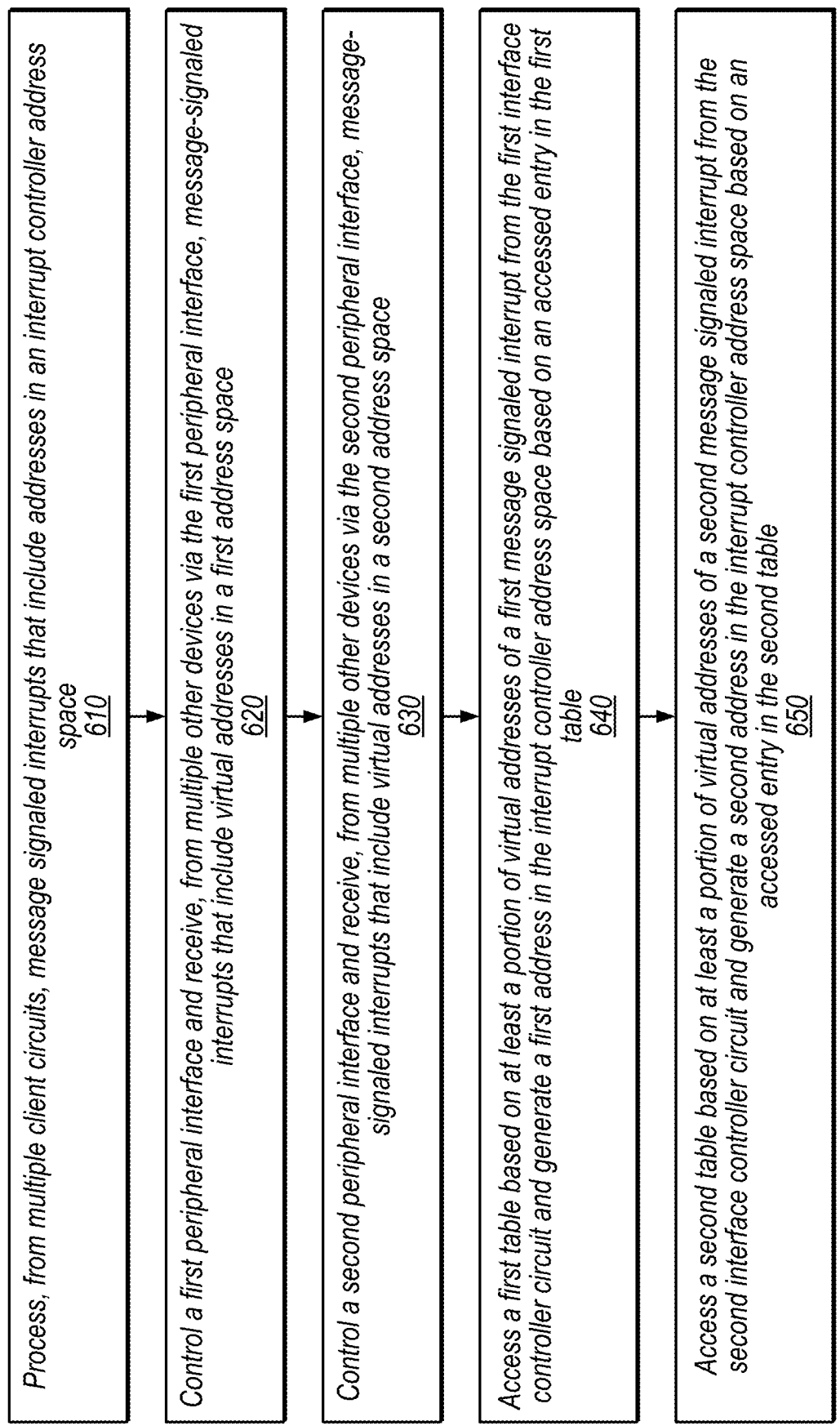
FIG. 6 is a flow diagram illustrating an example method for remapping message signaled interrupts, according to some embodiments.

FIG. 6 is a flow diagram illustrating an example method for remapping message signaled interrupts, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, interrupt control circuitry processes, from multiple client circuits, message signaled interrupts that include addresses in an interrupt controller address space.

At 620, in the illustrated embodiment, a first interface controller controls a first peripheral interface and receives, from multiple other devices via the first peripheral interface, message-signaled interrupts that include virtual addresses in a first address space.

At 630, in the illustrated embodiment, a second interface controller controls a second peripheral interface and receives, from multiple other devices via the second peripheral interface, message-signaled interrupts that include virtual addresses in a second address space.

In some embodiments, the first and second peripheral interfaces are PCIe interfaces, the first and second address spaces are the same virtual address space (e.g., due to the same address being programmed into the MSI address registers), and the first and second interface controllers are PCIe root complex links. In some embodiments, the first and second interface controllers are included in different PCIe root complexes.

At 640, in the illustrated embodiment, remap control circuitry accesses a first table based on at least a portion of virtual addresses of a first message signaled interrupt from the first interface controller circuit and generates a first address in the interrupt controller address space based on an accessed entry in the first table.

At 650, in the illustrated embodiment, remap control circuitry accesses a second table based on at least a portion of virtual addresses of a second message signaled interrupt from the second interface controller circuit and generates a second address in the interrupt controller address space based on an accessed entry in the second table.

In some embodiments, the remap control circuitry is configured not to expose the first address or the second address via the peripheral interface. In some embodiments, the remap control circuitry is configured to generate, based on data accessed in the first table, a one-hot encoded vector that indicates a bit within an interrupt controller register that corresponds to the first address in the interrupt controller address space.

In some embodiments, the device is (or includes) a system-on-a-chip that includes a communication fabric communicatively coupled to the interrupt control circuitry, one or more client circuits, and the remap control circuitry. In some embodiments, the remap controller circuitry is configured to transmit the first and second addresses in the interrupt controller address space over the communication fabric.

In some embodiments, for a device that requests multiple interrupts, the first table includes multiple contiguous entries. In some embodiments, software programs the multiple contiguous entries to indicate a set of locations in the interrupt controller interrupt space, at least two of which are non-contiguous (e.g., as shown in the example of FIG. 5).

In some embodiments, the remap control circuitry is further configured to translate a virtual address from one of the multiple other devices to a dynamic random-access memory (DRAM) address, in response to a determination that the virtual address is not within an interrupt address range.

In some embodiments, software, the remap control circuitry, or both are configured to enforce a rule that at most one entry in the first and second tables is allowed to indicate a given location in the interrupt controller address space.

In some embodiments, remap control circuitry is configured to adjust one or more entries in the first table based on connection of a new device to the peripheral interface or removal of a device from the peripheral interface.

In some embodiments, in response to a lack of available addresses in the interrupt controller address space, the remap control circuitry is configured to signal for one or more devices to use a legacy interrupt scheme via the peripheral interface.

Example Device

Figure 7:
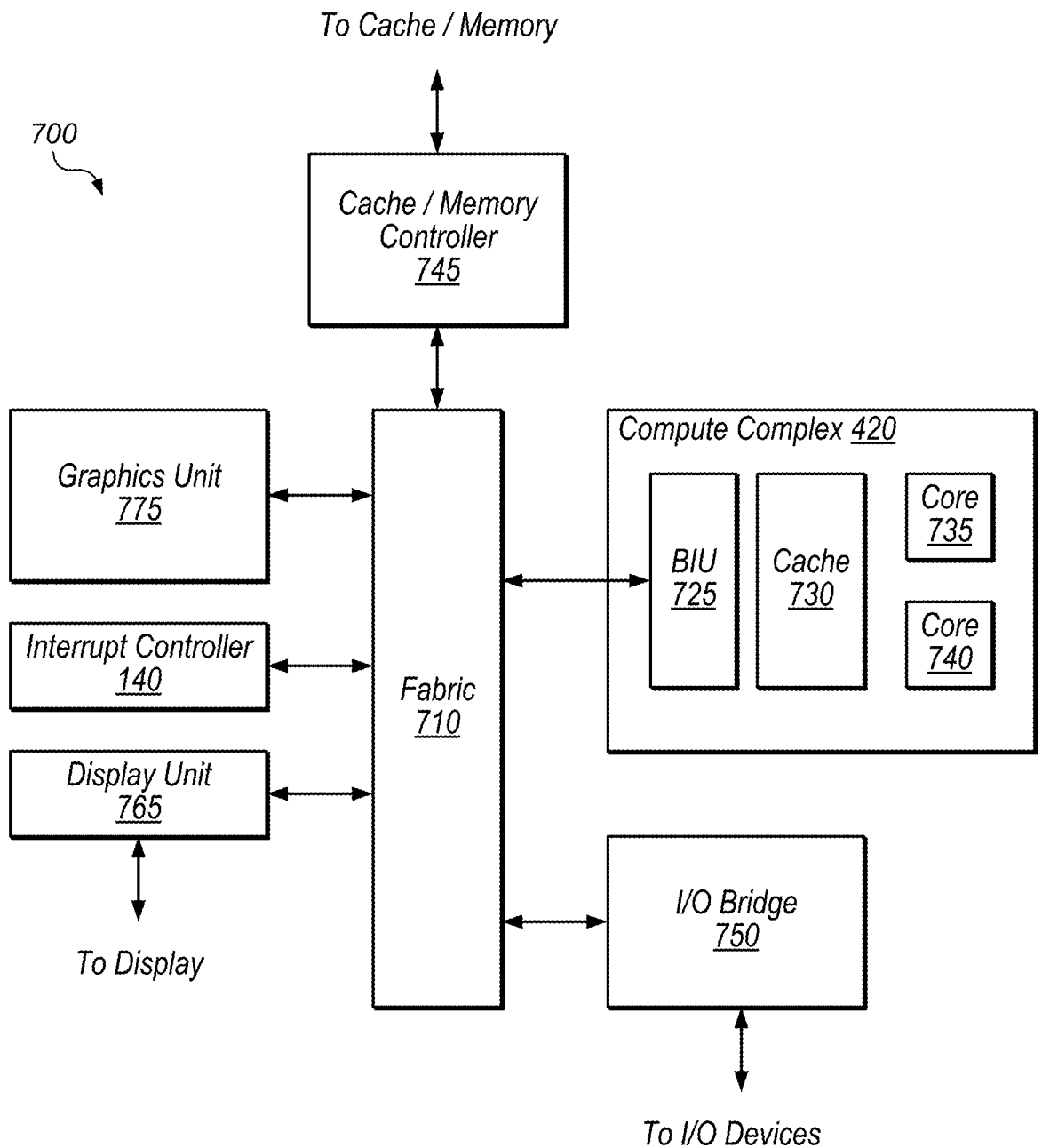
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

In the illustrated embodiment, interrupt controller 140 is connected to the fabric 710.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750. In some embodiment's, I/O bridge AAA50 includes remap control circuitry 120.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Example Applications

Figure 8:
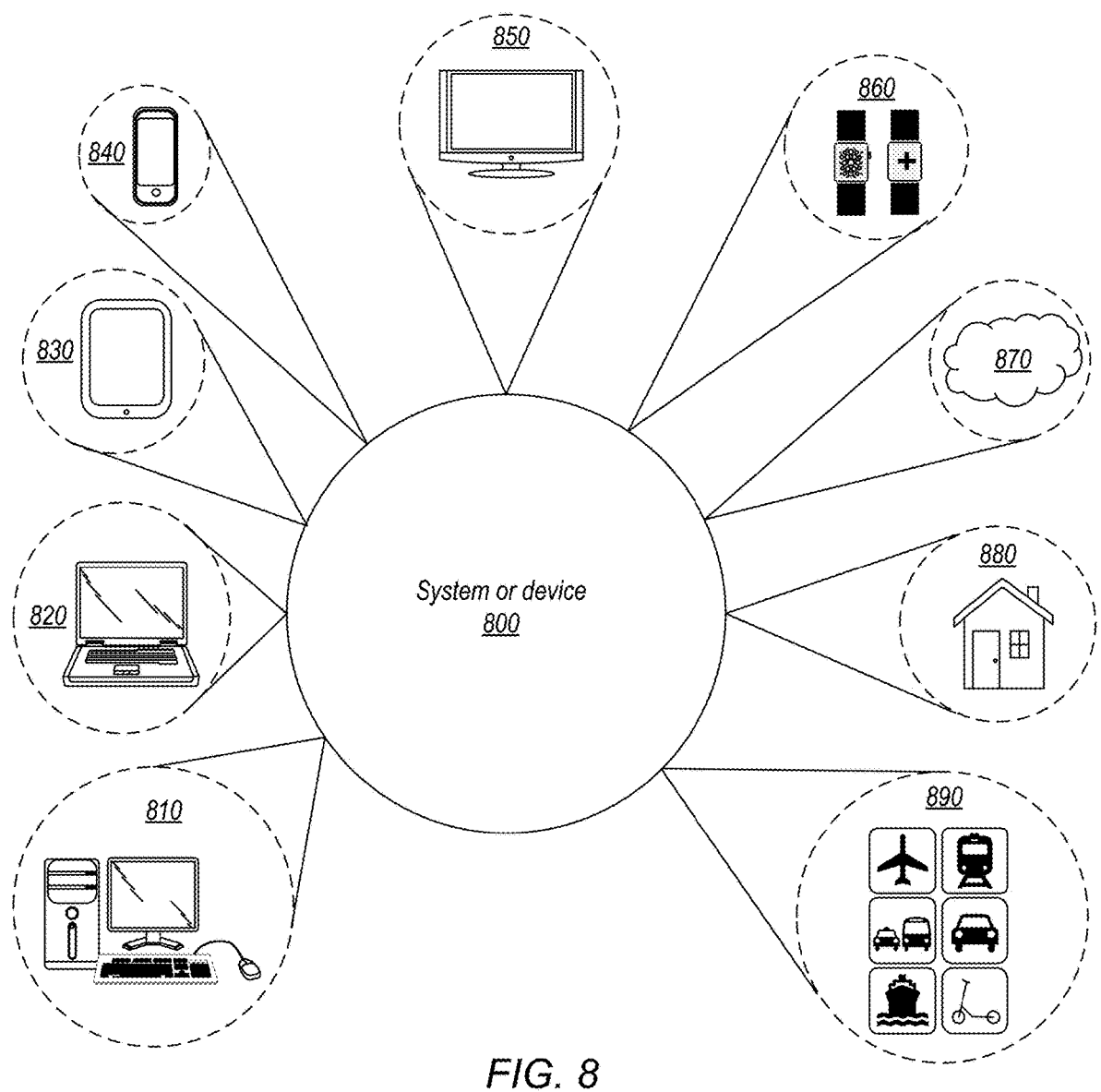
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
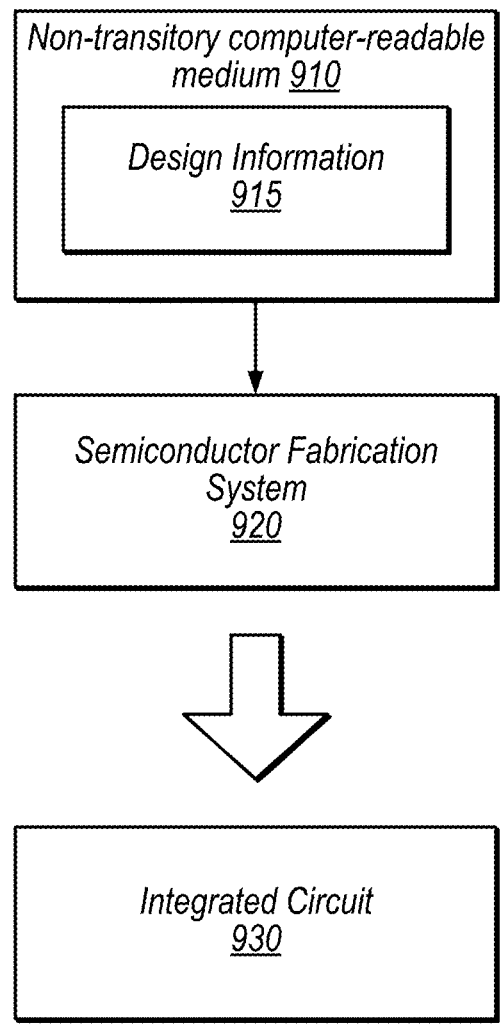
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-3 and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure Le something physical). More specifically, this formulation is used to indicate that this structure is arranged to perform the one or more tasks during operation. A structure can be said to be "configured to" perform some task even if the structure is not currently being operated. Thus, an entity, described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed. FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   interrupt control circuitry configured to process, from multiple client circuits, message signaled interrupts that include addresses in an interrupt controller address space;
   a first interface controller circuit configured to control a first peripheral interface and receive, from multiple other devices via the first peripheral interface, message-signaled interrupts that include virtual addresses in a first address space;
   a second interface controller circuit configured to control a second peripheral interface and receive, from multiple other devices via the second peripheral interface, message-signaled interrupts that include virtual addresses in a second address space;
   remap control circuitry configured to:
      access a first table based on at least a portion of virtual addresses of a first message signaled interrupt from the first interface controller circuit and generate a first address in the interrupt controller address space based on an accessed entry in the first table; and
      access a second table based on at least a portion of virtual addresses of a second message signaled interrupt from the second interface controller circuit and generate a second address in the interrupt controller address space based on an accessed entry in the second table.

2. The apparatus of claim 1, wherein the first and second peripheral interfaces are PCIe interfaces, the first and second address spaces are the same virtual address space, and the first and second interface controller circuits are PCIe root complex links.

3. The apparatus of claim 2, wherein the first and second interface controller circuits are included in different PCIe root complexes.

4. The apparatus of claim 1, wherein:
the apparatus is a system-on-a-chip that includes a communication fabric communicatively coupled to the interrupt control circuitry, one or more client circuits, and the remap control circuitry; and
the remap controller circuitry is configured to transmit the first and second addresses in the interrupt controller address space over the communication fabric.

5. The apparatus of claim 1, wherein the remap control circuitry is configured to generate, based on data accessed in the first table, a one-hot encoded vector that indicates a bit within an interrupt controller register that corresponds to the first address in the interrupt controller address space.

6. The apparatus of claim 1, wherein:
for a device that requests multiple interrupts, the first table includes multiple contiguous entries; and
the multiple contiguous entries indicate a set of locations in the interrupt controller interrupt space, at least two of which are non-contiguous.

7. The apparatus of claim 1, wherein the remap control circuitry is further configured to:
translate a virtual address from one of the multiple other devices to a dynamic random-access memory (DRAM) address, in response to a determination that the virtual address is not within an interrupt address range.

8. The apparatus of claim 1, wherein the remap control circuitry is configured to enforce a rule that at most one entry in the first and second tables is allowed to indicate a given location in the interrupt controller address space.

9. The apparatus of claim 1, wherein the remap control circuitry is configured not to expose the first address or the second address via the peripheral interface.

10. The apparatus of claim 1, wherein the remap control circuitry is configured to adjust one or more entries in the first table based on connection of a new device to the peripheral interface or removal of a device from the peripheral interface.

11. The apparatus of claim 1, wherein, in response to a lack of available addresses in the interrupt controller address space, the remap control circuitry is configured to signal for one or more devices to use a legacy interrupt scheme via the peripheral interface.

12. The apparatus of claim 1, wherein the apparatus is a computing device that includes:
a central processing unit;
a display; and
network interface circuitry.

13. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

interrupt control circuitry configured to process, from multiple client circuits, message signaled interrupts that include addresses in an interrupt controller address space;
a first interface controller circuit configured to control a first peripheral interface and receive, from multiple other devices via the first peripheral interface, message-signaled interrupts that include virtual addresses in a first address space;
a second interface controller circuit configured to control a second peripheral interface and receive, from multiple other devices via the second peripheral interface, message-signaled interrupts that include virtual addresses in a second address space;
remap control circuitry configured to:
access a first table based on at least a portion of virtual addresses of a first message signaled interrupt from the first interface controller circuit and generate a first address in the interrupt controller address space based on an accessed entry in the first table; and
access a second table based on at least a portion of virtual addresses of a second message signaled interrupt from the second interface controller circuit and generate a second address in the interrupt controller address space based on an accessed entry in the second table.

14. The non-transitory computer readable storage medium of claim 13, wherein:
the circuit is a system-on-a-chip that includes a communication fabric communicatively coupled to the interrupt control circuitry, one or more client circuits, and the remap control circuitry; and
the remap controller circuitry is configured to transmit the first and second addresses in the interrupt controller address space over the communication fabric.

15. The non-transitory computer readable storage medium of claim 13, wherein the remap control circuitry is configured to generate, based on data accessed in the first table, a one-hot encoded vector that indicates a bit within an interrupt controller register that corresponds to the first address in the interrupt controller address space.

16. A non-transitory computer-readable medium having instructions stored thereon that are executable by a computing device to perform operations comprising:
processing, from multiple client circuits, message signaled interrupts that include addresses in an interrupt controller address space;
programming a first table for a first interface controller circuit that controls a first peripheral interface, wherein the first peripheral interface supports message-signaled interrupts that include virtual addresses in a first address space; and
programming a second table for a second interface controller circuit that controls a second peripheral interface, wherein the second peripheral interface supports message-signaled interrupts that include virtual addresses in a second address space;
wherein the programming the first and second tables indicates mappings between addresses in the first and second address spaces and the interrupt controller address space.

17. The non-transitory computer-readable medium of claim 16, wherein the first and second peripheral interfaces are PCIe interfaces, the first and second address spaces are the same address space, and the first and second interface controller circuits are PCIe root complex links.

18. The non-transitory computer-readable medium of claim 17, wherein the programming the first and second tables operates according to a rule that at most one entry in the first and second tables is allowed to indicate a given location in the interrupt controller address space.

19. The non-transitory computer-readable medium of claim 16, wherein a programmed entry the first table indicates a one-hot encoded vector that specifies a bit within an interrupt controller register, wherein the interrupt controller register corresponds to a mapped address in the interrupt controller address space.

20. The non-transitory computer-readable medium of claim 16, wherein:
- for a device that requests multiple interrupts, the first table includes multiple contiguous entries; and
- the multiple contiguous entries indicate a set of locations in the interrupt controller interrupt space, at least two of which are non-contiguous.

* * * * *